United States Patent [19]
Park et al.

[11] Patent Number: 5,313,494
[45] Date of Patent: May 17, 1994

[54] COMPACT SUPERPOSED MODULATED SIGNAL GENERATOR

[75] Inventors: Il-geun Park; Jong-su Seo, both of Suwon, Rep. of Korea

[73] Assignee: Samsung Electronics Co., Ltd., Kyunggi-do, Rep. of Korea

[21] Appl. No.: 796,619

[22] Filed: Nov. 22, 1991

[30] Foreign Application Priority Data

May 28, 1991 [KR] Rep. of Korea ............ 91-8743

[51] Int. Cl.$^5$ ............ H04L 27/04; H04L 27/12; H04L 27/20
[52] U.S. Cl. ............ 375/59; 375/60; 332/103; 341/68
[58] Field of Search ............ 328/30, 31; 332/103; 341/68, 69; 364/724.1; 375/39, 59, 60, 96, 102, 103

[56] References Cited

U.S. PATENT DOCUMENTS

| | | | |
|---|---|---|---|
| 4,339,724 | 7/1982 | Feher | 375/61 X |
| 4,417,349 | 11/1983 | Hills et al. | 375/60 |
| 4,598,267 | 7/1986 | Fukuda | 341/68 X |
| 4,644,565 | 2/1987 | Seo et al. | 375/60 |
| 4,731,800 | 3/1988 | Motley et al. | 375/60 X |

*Primary Examiner*—Stephen Chin
*Assistant Examiner*—Bryan Webster
*Attorney, Agent, or Firm*—Leydig, Voit & Mayer

[57] ABSTRACT

A compact superposed modulated signal generator for use in a digital transmission system for transmitting digital information, including a first filter for converting an input NRZ digital data signal into a double interval raised cosine pulse, a second filter for converting the input NRZ digital data into a single interval raised cosine pulse, an attenuator for attenuating the signal output from the second filter, an adder/subtracter for superposing a signal generated by the first filter with a signal controlled by the attenuator, and a third filter for controlling the bandwidth of a signal superposed by the adder/subtracter. The compact superposed modulated signal generator can be used in a satellite communication system, a mobile radio system, and terrestrial microwave communication links.

7 Claims, 10 Drawing Sheets

(a) A=0.7 fc=1.0fn N=3  (b) A=0.8 fc=1.2fn N=4
(c) A=0.9 fc=1.3fn N=5  (d) A=1.0 fc=1.4fn N=6

COMPACT SUPERPOSED MODULATED SIGNAL GENERATOR

BACKGROUND OF THE INVENTION

The present invention relates to a compact superposed modulated signal generator for supplying a compact superposed modulated signal for use in a digital transmission system to transmit digital information, and more particularly to a compact superposed modulated signal generator by which the signal to be transmitted has a narrow occupied bandwidth and low distortion of the modulated waveform even if transmitted by a non-linear amplifier. Such a compact superposed modulated signal generator is useful in satellite communication systems, mobile radio systems, and terrestrial microwave communication links, which require more information to be transmitted within a limited transmission bandwidth and at higher power efficiency.

Conventional digital transmission systems normally deal with binary data signals in the non-return-to-zero (NRZ) form and modulate a single carrier or quadrature carrier, and then transmit the modulated carrier to receivers via transmission channels such as a satellite or microwave communication link. In order to obtain sufficient transmission power at the output stage, the signal is amplified by a high power amplifier (HPA). The HPA is required to operate in its saturation region so that the system may more efficiently utilize its power. Operation in the saturation region is particularly necessary for mobile transmission systems which need much longer transmission time using limited power. Further, in order for more than one user to transmit signals at the same time within a limited bandwidth, a bandwidth efficient signal is required for the modulated signal.

The quadrature phase shift keying (QPSK) method which limits the bandwidth using a raised cosine filter is widely used in most of the digital transmission systems owing to its very narrow occupied bandwidth in a linear channel and simple hardware implementation. However, when a QPSK modulated signal is band-limited by a filter and transmitted by an HPA operating in the saturation region, transmission spectral side lobes at the output of HPA regrow due to the non-linear amplification of the HPA. The regrown side lobes cause serious degradations into adjacent channels, and the probability of error increases. Therefore, for power and bandwidth efficient applications, QPSK method is not a desirable modulation technique.

To achieve power and bandwidth efficient digital transmission systems, the power spectrum of a non-linearly amplified modulated signal should have a narrow main lobe and low regrowth in its side lobes. To decrease probability of error, timing jitter and inter-symbol interference of the received signal should be minimized.

Among the recent studies on power and bandwidth efficient modulation techniques, the inventions of U.S. Pat. No. 4,339,724 titled "Filter" (IJF-OQPSK) by Dr. Kamilo Feher and U.S. Pat. No. 4,644,565 titled "Superposed Quadrature Modulated Baseband Signal Processor" (SQAM) by Dr. J. S. Seo and Dr. K. Feher relate to a modulated signal generator for detecting two consecutive bits of an input NRZ signal and generating a double interval raised cosine pulse waveform according to the input data format. The latter invention is a technology capable of controlling main and side lobes by superposing by raised cosine pulse signal of the former invention with a single interval raised cosine pulse of a different amplitude.

The aforementioned two modulation techniques have lower spectral regrowth due to a non-linearity of HPA than do QPSK, offset-QPSK, and better probability of error performance. However, since their respective main lobe occupied bandwidths are wider than that of a QPSK modulating system band-limited by a conventional raised cosine filter, the probability of error may increase if the distance between the desired and adjacent channels is very narrow.

SUMMARY OF THE INVENTION

Therefore, it is an object of the present invention to provide a compact superposed modulated signal generator for generating a power efficient modulated signal which has low regrowth of the side lobe even if an HPA is operating in its non-linear or the saturation region.

It is another object of the present invention to provide a compact superposed modulated signal generator for generating a bandwidth efficient modulated signal which has a narrow main lobe in a linear or non-linear channel.

It is still another object of the present invention to provide a compact superposed modulated signal generator for generating a modulated signal which decreases the probability of error even when restoring data in a receiver with simplified hardware.

To accomplish the above objects, there is provided a compact superposed modulated signal generator in a signal generator for transmission of digital signal, according to the present invention comprising a first filter for converting an input NRZ digital data into a double interval raised cosine pulse, a second filter for converting an input NRZ digital data into a single interval raised cosine pulse, an attenuator for attenuating a signal output from the second filter, an adder/subtracter for superposing a signal generated by the first filter with a signal controlled by the attenuator, and a third filter for controlling an occupied bandwidth of the signal superposed by the adder/subtracter.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
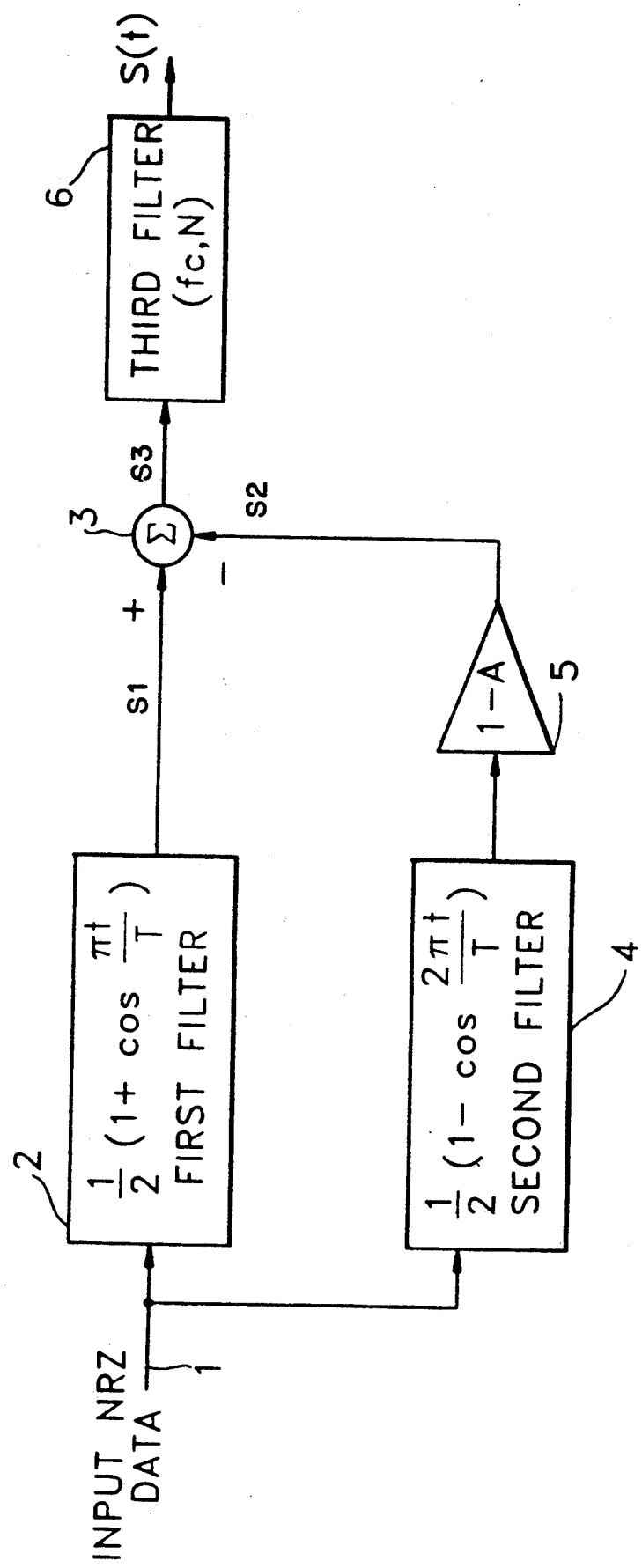
FIG. 1 is a block diagram of a compact superposed modulated signal according to the present invention.

Referring to FIG. 1, input NRZ digital data are supplied to two filters 2 and 4 via a transmission path 1. First filter 2 receives the NRZ data and generates a double interval raised cosine function whose impulse response is $0.5(1+\cos \pi t/T)$, where T is one symbol duration of the input data which is varied within $-T \leq t \leq T$. Output S1 of filter 2 is supplied to the positive input port of a subtracter 3. The other side of transmission path 1 is connected to a second filter 4 which has impulse response characteristic expressed as $0.5 (1-\cos 2\pi t/T)$ for $-T \leq t \leq T$ and generates a single interval cosine function with a period half that of first filter 2.

Output S2 of second filter 4 is supplied to the negative input port of subtracter 3 via an attenuator 5 for attenuating the amplitude of a waveform by 1-A, where A is an attenuation value representing the amplitude parameter of the attenuator 5.

Two signals S1 and S2 input to subtracter 3 are superposed, i.e., algebraically summed, to produce a signal S3 ($=S1-S2$) which is supplied to an input of a third filter 6.

The third filter 6 is a low-pass filter whose 3dB cut-off frequency fc is below 1/T. The third filter 6 incorporates the number of poles N and the filter transfer function determined according to the application field and required characteristics of the system to which the present invention is adapted. The third filter 6 limits the frequency spectrum of signal S3 from subtracter 3 and converts signal S3 to narrow the bandwidth of the main and side lobes, thereby generating the output S(t) of the present invention.

Operation of the present invention will be described below in detail with reference to FIGS. 1 and 2.

Figure 2:
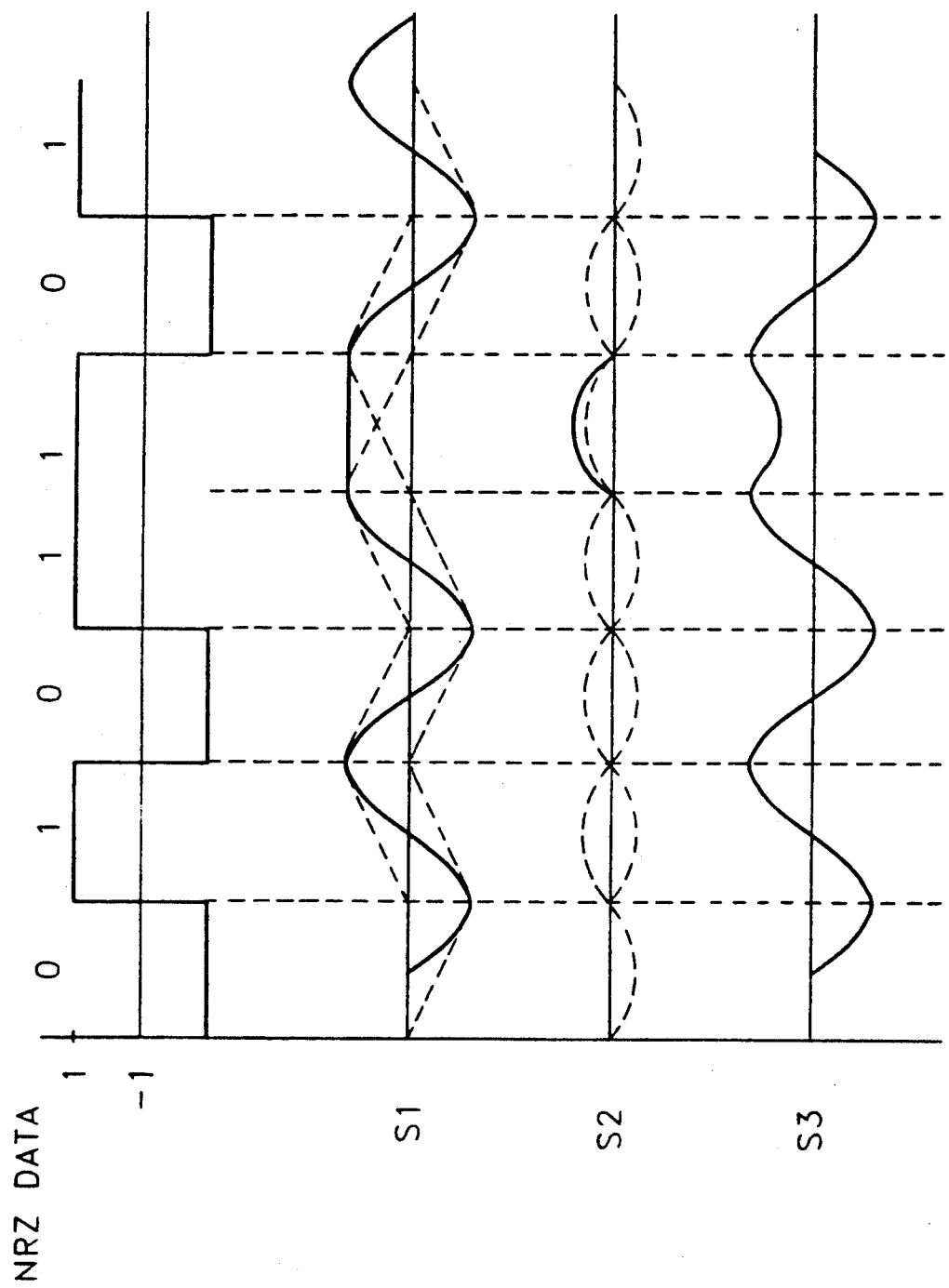
FIG. 2 shows waveforms of the respective components of FIG. 1 and illustrates the process of generating a compact superposed modulated signal.

The NRZ input digital data is converted to a double interval raised cosine function in first filter 2, and as shown in FIG. 2, two waveforms indicated by dotted lines are superposed according to the data polarity over two periods, generating waveform S1 indicated as a solid line, as the output from first filter 2.

Simultaneously, second filter 4 also receives and filters the same data as first filter 2, and then as shown in S2 of FIG. 2, generates single interval cosine functions indicated as dot lines according to the data polarity, which are superposed to be attenuated according to the value A in attenuator 5 and output as S2 represented by the solid line.

The two outputs S1 and S2 are superposed to become S3 ($=S1-S2$), producing the amplitude difference between the two signals. The signal S3 passes through third filter 6 which limits its bandwidth to generate a compact superposed modulated signal S(t) for the present invention.

Figure 3:
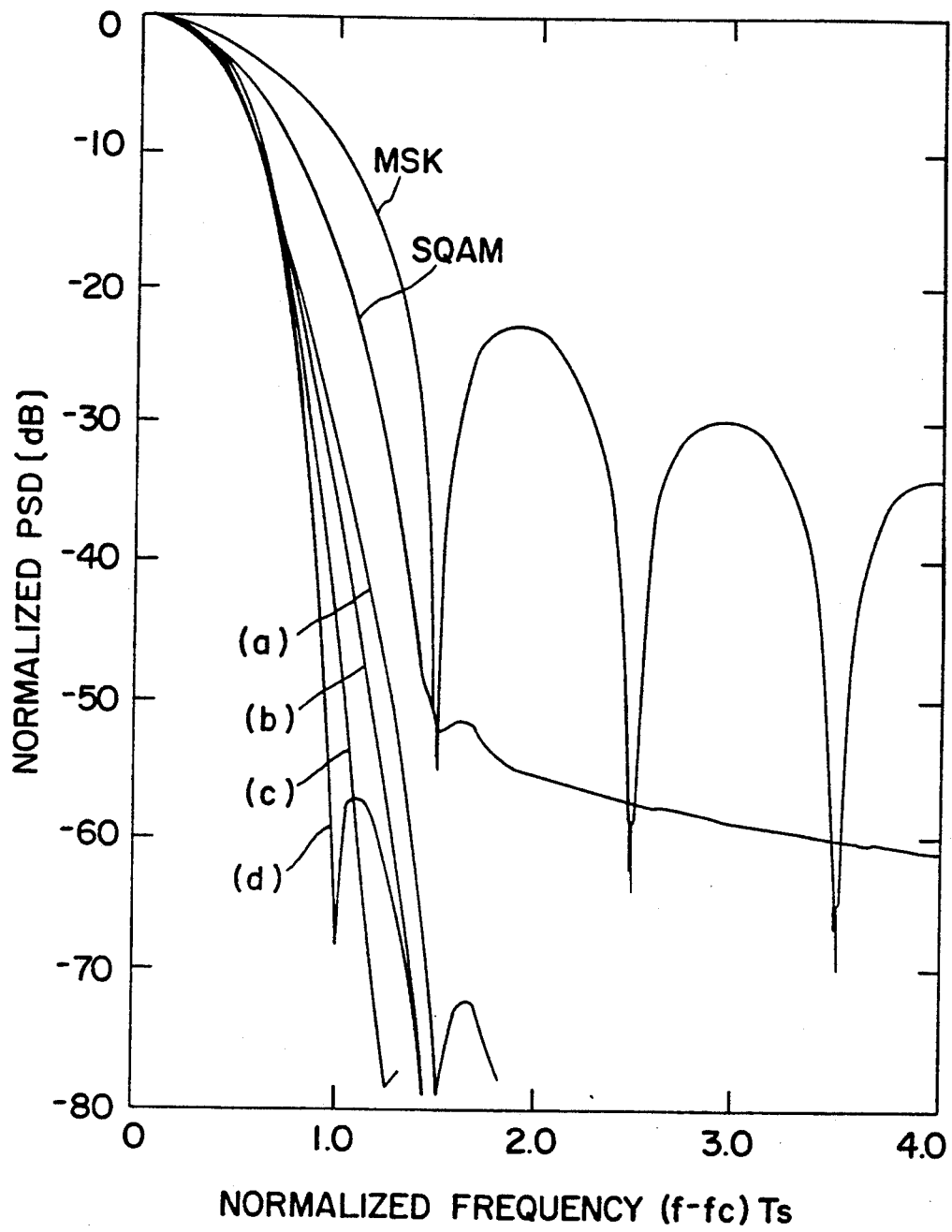
FIG. 3 is a graph of the baseband power spectrum of a compact superposed signal generated according to the present invention.

The occupied bandwidth power spectrum of the main and side lobes of the compact superposed modulated signal S(t) depends upon the value A of attenuator 5, 3dB cut-off frequency fc of third filter 6, pole number N, and the transfer function. Thus, the characteristic of third filter 6 in the operation of the present invention are very important and should have little ripple and constant group delay properties for its passband, so as to minimize the intersymbol interference (ISI) and decrease the probability of errors when receiving signals of the present invention. When a Butterworth filter is selected as third filter 6, the power spectrum variations of the baseband in a linear channel for different values of 3dB cut-off frequency fc, pole number N and value A is as shown in FIG. 3. Since the power spectrum and error probability vary according to these variation, the factors are determined to satisfy the requirements of the main and side lobes of a system to which the present invention is applied.

Figure 4:
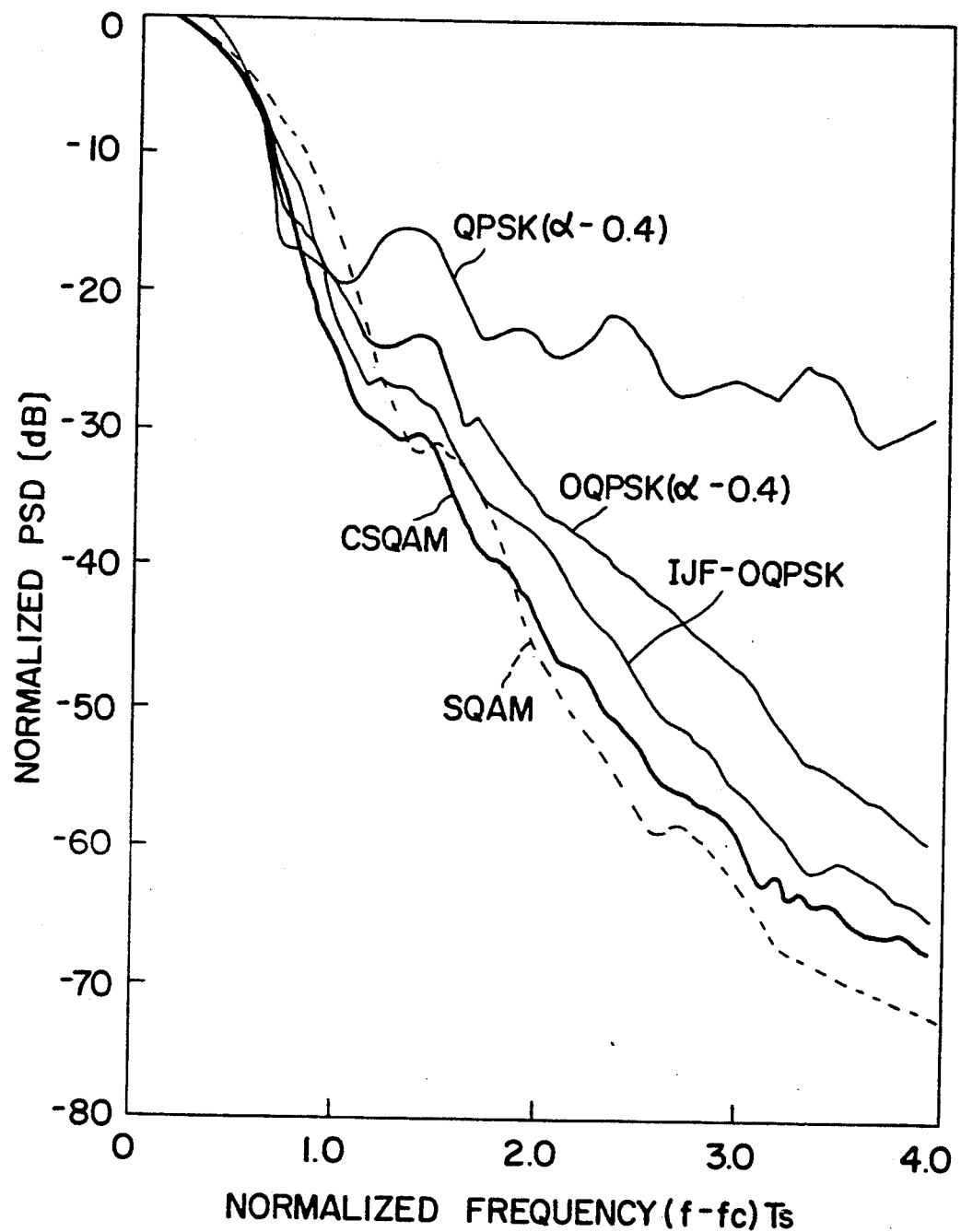
FIG. 4 is a graph illustrating the comparison of the baseband power spectrum of a compact superposed modulated signal of the present invention in a non-linear channel, with the power spectra of other modulating methods.

To clarify the properties of the present invention in a non-linear channel, FIG. 4 shows the comparison result between the baseband power spectrum in a non-linear channel according to the present invention and the power spectra according to the conventional IJF-OQPSK, SQAM, OQPSK, and QPSK modulation method, when design factors of the compact superposed signal generator of the present invention, that is, A is set to 0.7, the 3dB cut-off frequency fc to 1.3fn (where fn is the Nyquist frequency, or $\frac{1}{2}T$), and the number of poles N to 6. FIG. 4 shows a result of computer simulation by adopting a characteristic model when an HPA amplifier for use in INTELSAT satellite as a non-linear channel operates in the saturation region (0dB input back-off). As shown in FIG. 4, the main lobe of the power spectrum of the present invention has a narrower occupied bandwidth than IJF-OQPSK and SQAM, and lower side lobe regrowth in a non-linear channel than conventional QPSK, OQPSK and MSK modulating methods, so that the present invention provides for a bandwidth and power efficient modulated signal.

Figure 5:
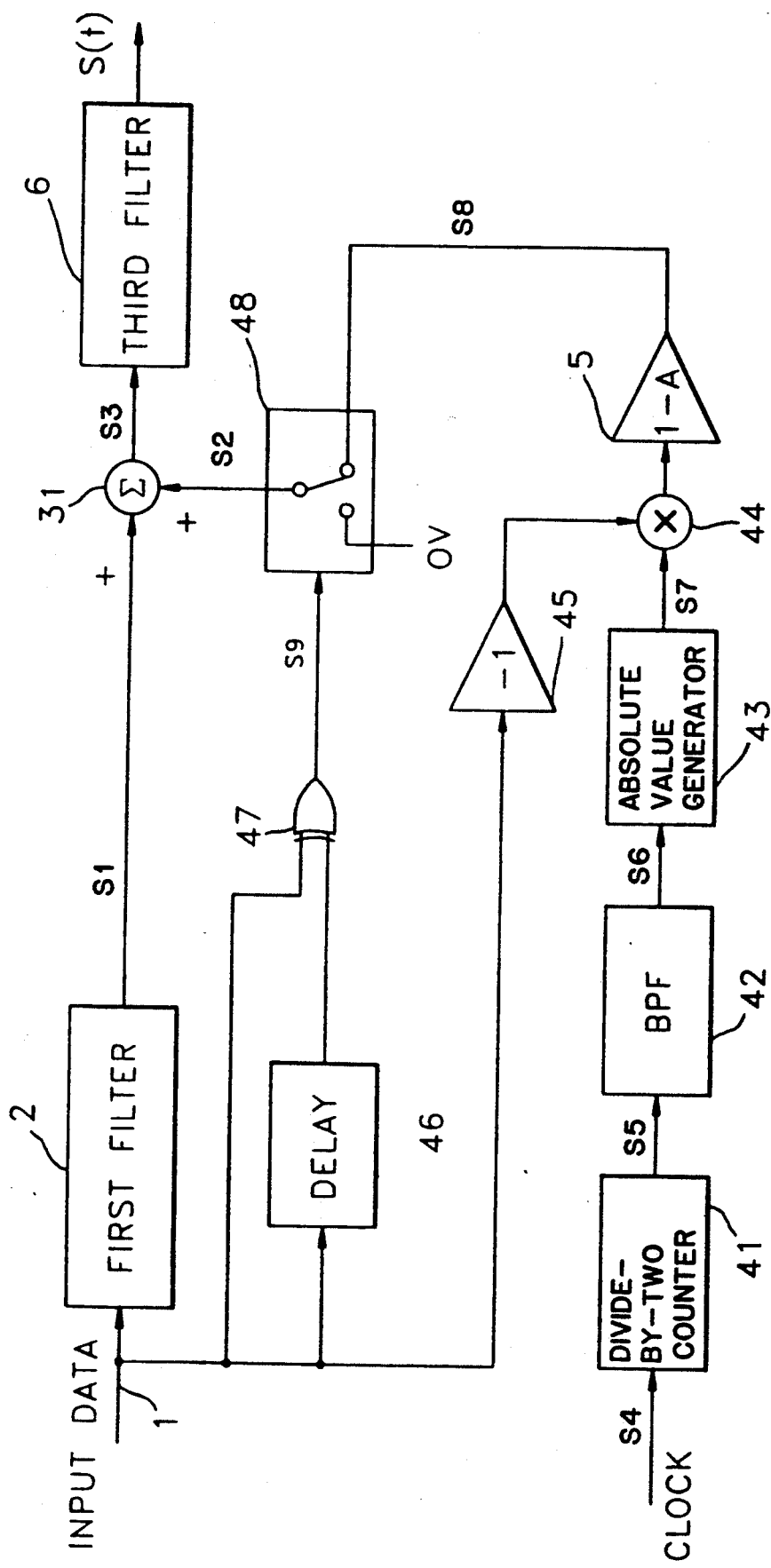
FIG. 5 is a block diagram representing an embodiment of FIG. 1 showing a second filter and the attenuator in more detail.

FIG. 5 shows another embodiment of the present invention wherein a first filter 2, an attenuator 5 and a third filter 6 are the same as in FIG. 1, but subtracter 3 has been replaced with an adder 31. FIG. 5 depicts a specific embodiment of the second filter 4 of FIG. 1, which realizes a $0.5 (1-\cos 2\pi t/T)$ impulse response. Here a basic clock S4 of NRZ digital data is transmitted to a divide-by-two counter 41. Then, the signal passing through a band-pass filter 42 to make a cosine function signal according to the half-frequency clock and output of BPF 42 is transmitted to an absolute value generator 43 which produces the absolute value of that signal. A multiplier 44 multiplies the output of the absolute value generator 43 with inverted input data from an inverter 45. The multiplied output signal passes through attenuator 5 to be transmitted to an input port of a switch 48. Switch 48 has two inputs and outputs one of these two inputs according to a switching control signal S9 to supply a ground potential (zero volt) or the signal from attenuator 5 to one input port of adder 31. Meanwhile, the NRZ input data signal and data delayed by a delay circuit 46 for one symbol period are transmitted to an XOR gate 47 whose logical result is then transmitted to the control port of switch 48 as the above-mentioned switching control signal S9.

Figure 6:
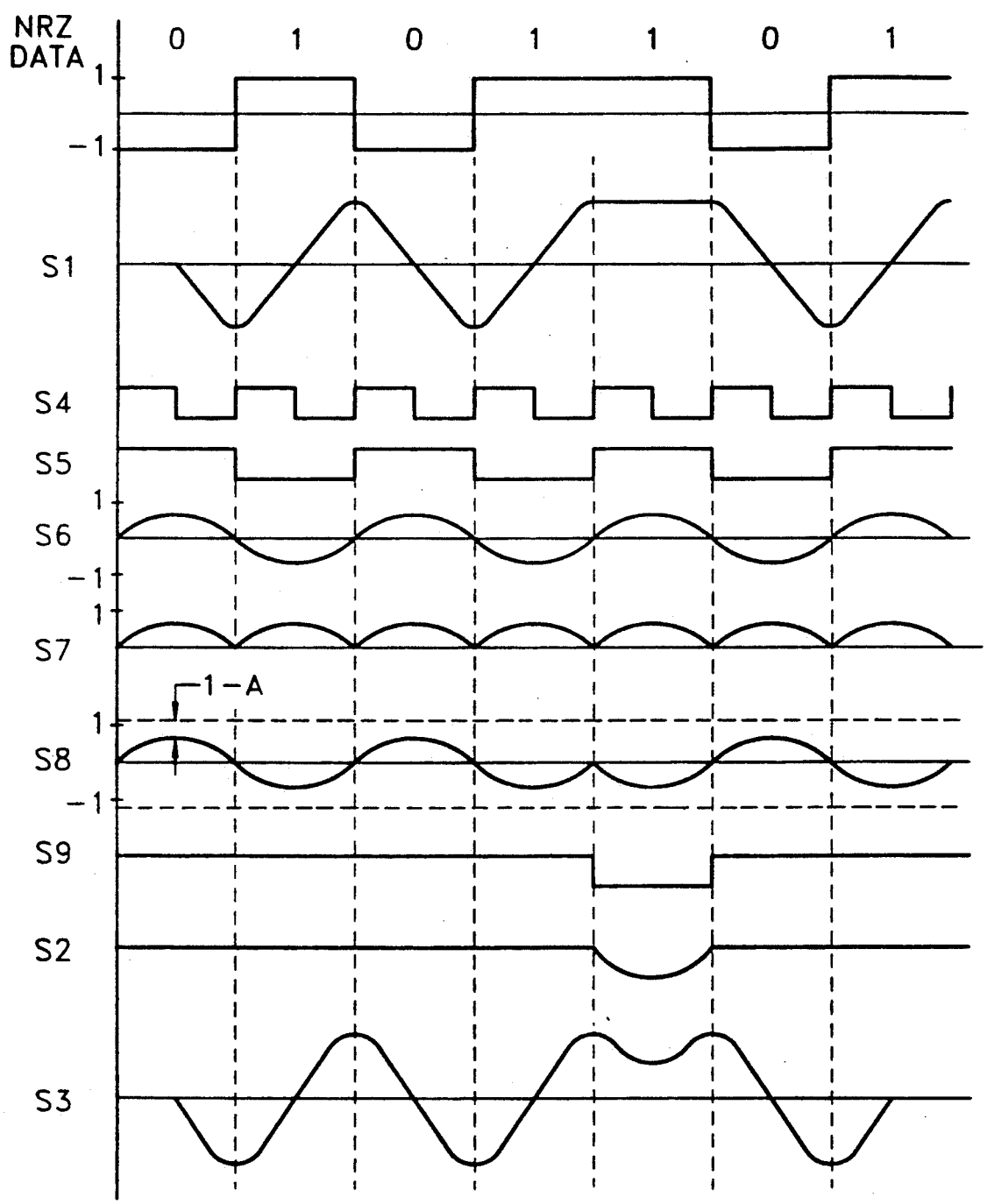
FIG. 6 shows waveforms of the respective components of FIG. 5.

Operation of the embodiment will be described with reference to FIG. 5 and the waveforms of FIG. 6.

An input NRZ data signal is input to a first filter 2 to be converted to a signal with waveform S1. A basic clock signal S4 of the input data signal is divided in divide-by-two counter 41 to become a signal S5. The signal S5 is filtered in a band-pass filter 42 and converted to waveform S6. The absolute value of signal S6 is taken from the absolute value generator 43 to be output as a signal S7 which is supplied to one input port of multiplier 44.

The input signal to the other input port of the multiplier is a signal which is supplied after the input data has been inverted by inverter 45. These two signals are supplied to multiplier 44, multiplied therein, and passed through attenuator 5, becoming a signal S8. Since FIG. 5 employs adder 31 instead of the subtracter 3 shown in FIG. 1, the inverter 45 plays the role of polarity inversion of signal S8 so that S2 is in effect subtracted from S1. When the subtracter 3 of FIG. 3 is employed, the inverter is unnecessary.

Input data is delayed by the delay 46 for one symbol period and then the delayed data is sent to XOR gate 47 together with the present data bit. The two serial input data bits are logically compared in XOR gate 47 and if their polarity matches, a logic 0 is output from XOR gate 47. The signal such as S9 is supplied to the switching control port of switch 48 to supply a signal S8 to the adder. Conversely, if the polarities of the serial input data bits do not match (that is, [1, −1] or [−1, 1]), a logic "1" is output from XOR gate 47 as waveform S9, which controls the switch 48 to output 0V. This operation creates a conditional waveform such as waveform S2 which is then supplied to an adder 31.

The adder 31 adds the signals S1 and S2 to become signal S3 which passes through a third filter 6 to be output as a compact superposed modulated signal S(t) resulted from the present invention.

Figure 7:
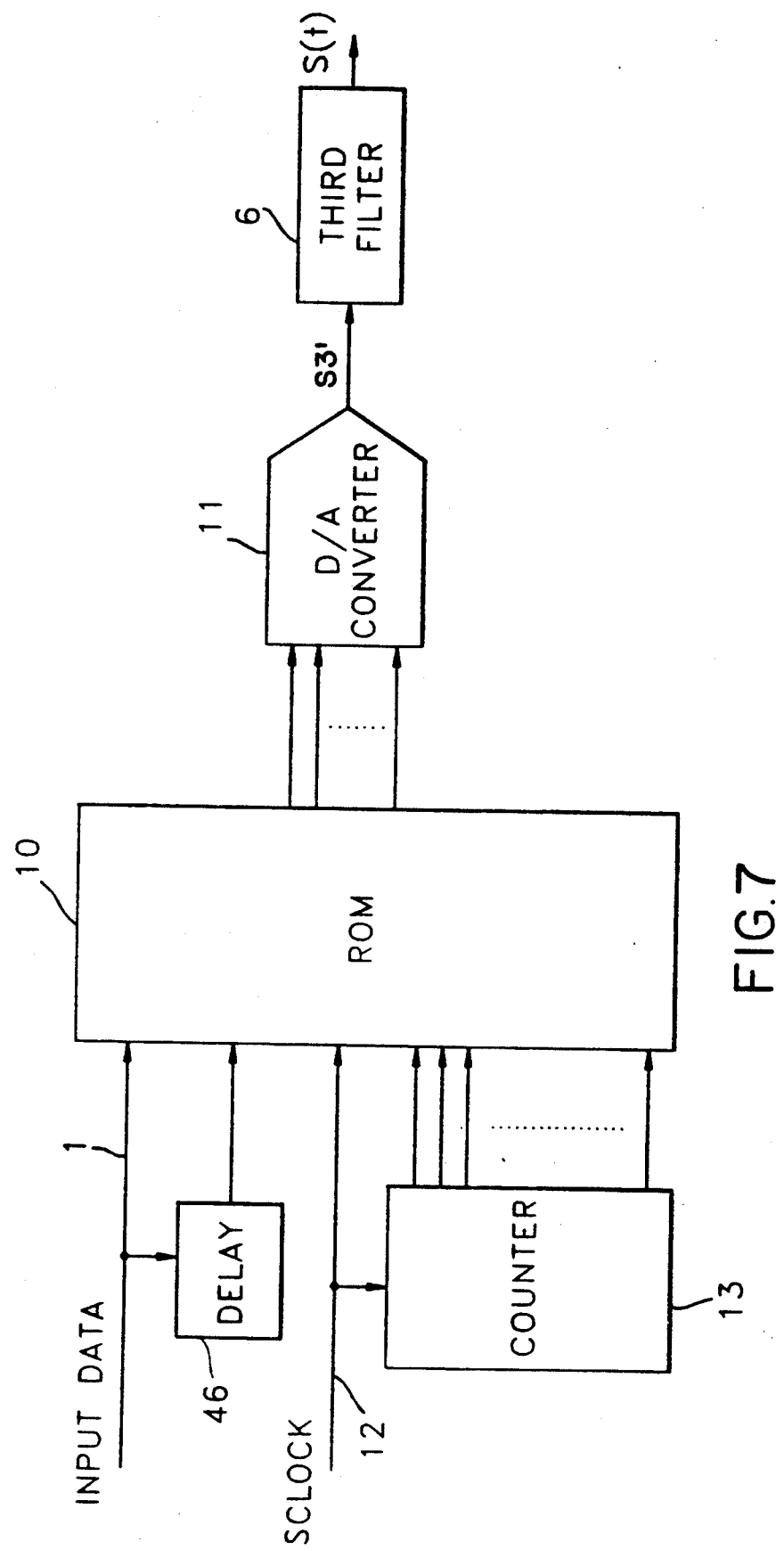
FIG. 7 shows another embodiment of the present invention which consists of a memory device and a filter, etc.

FIG. 7 is another embodiment of the present invention and shows an example of a simple construction applied to a system which requires slow transmission speed.

An input NRZ digital data signal, a data signal delayed in a delay 46 for one symbol period, an S clock and the output of an S counter 13 which divides the S clock 12 by S, are supplied as address signals of a ROM 10. The ROM 10 outputs a digital signal corresponding to the address determined by the polarities of the input data signal and the S clock. The ROM 10 stores the value such that all of S3 waveforms of the present invention according to the polarity variation of two bits of serial input signals are previously sampled by S-multiple and digitized.

The output of the ROM 10 is transmitted to a digital-to-analog (D/A) converter 11. The D/A converter 11 outputs a step waveform signal S3' similar to the above signal S3 but quantized by the S clock. Since a step waveform usually has unnecessary frequency components corresponding to the S-multiple of the basic symbol clock, that is, the frequency dividing ratio, a simple filter is installed on the output of D/A converter 11 to eliminate those unnecessary frequencies and obtain the desired signal. In the present invention, a third filter 6 is directly connected to the output of D/A converter 11, eliminating the unnecessary frequency component, while at the same time, generating the compact superposed modulated signal S(t) resulted from the present invention.

Figure 8:
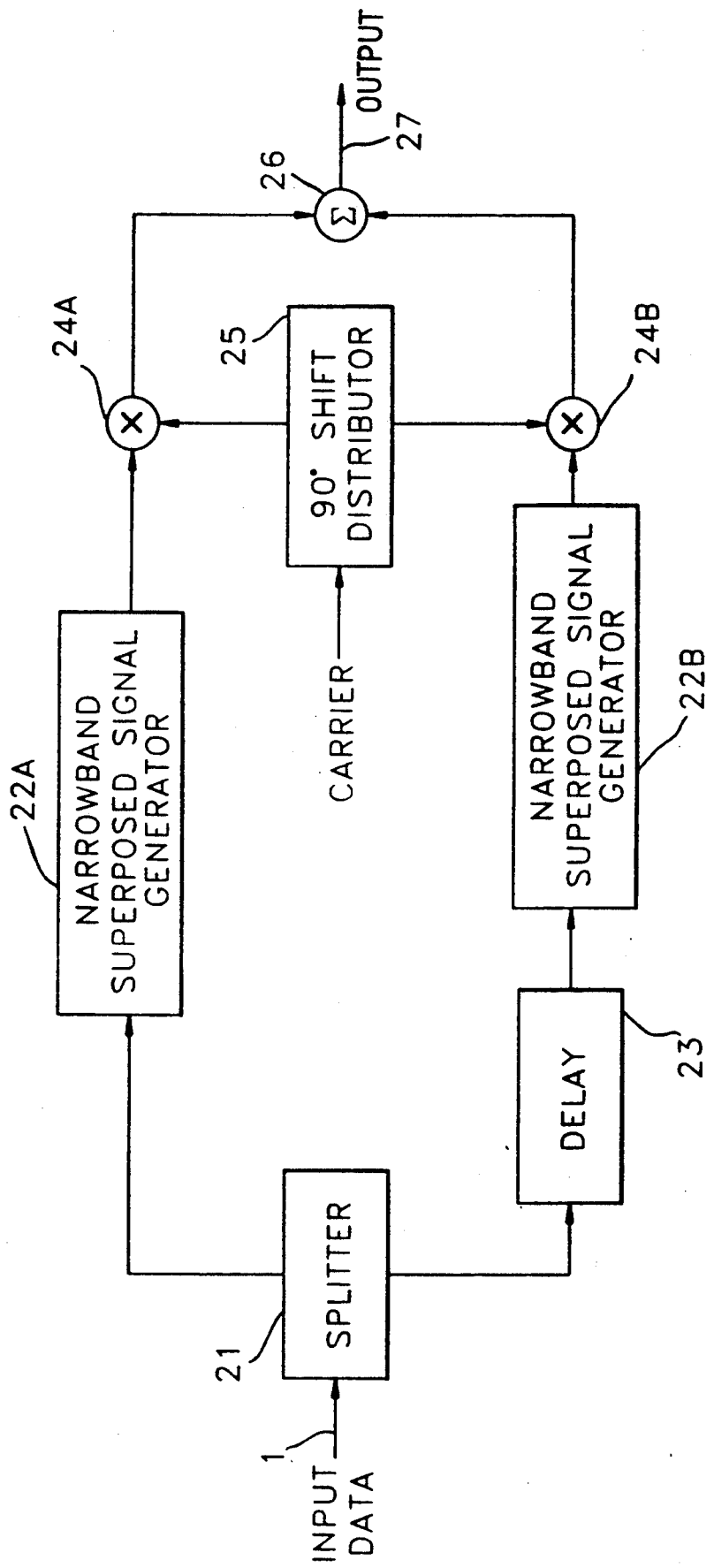
FIG. 8 is an exemplary diagram of the present invention employed in a digital transmission modulator.

FIG. 8 is an exemplary diagram of the present invention which is applied to a digital transmission system. The exemplary diagram shows a digital signal modulator wherein two compact superposed modulated signal generators of the present invention are further provided to the conventional offset-QAM (or QPSK) modulator.

An input NRZ digital data signal is split by a splitter 21 into two paths, one of which is input to a compact superposed modulated signal generator 22A and the other is supplied to a delay 23. The output of the delay 23 is input to the other compact superposed modulated signal generator 22B. The outputs of generators 22A and 22B are input to multipliers 24A and 24B, respectively, the other input of which is provided with a carrier via a 90° shift distributor 25. The unshifted carrier is supplied to the multiplier 24A while multiplier 24B receives the 90° shifted carrier. The outputs of the two multipliers 24A and 24B are vector-summed in an adder 26 to become the modulated carrier signal output via a transmission path 27.

Since the exemplary diagram of FIG. 8 shows the structure wherein a raised cosine filter in the conventional offset-QAM modulator is replaced with the compact superposed signal generator of the present invention, a modulator using the present invention requires no additional bandwidth limiting filter. In other words, the device of the present invention may be used as a bandwidth limiting filter. A modulator which receives the modulated signal resulted from the present invention can use an existing offset-QAM demodulator without any modification.

Figure 9:
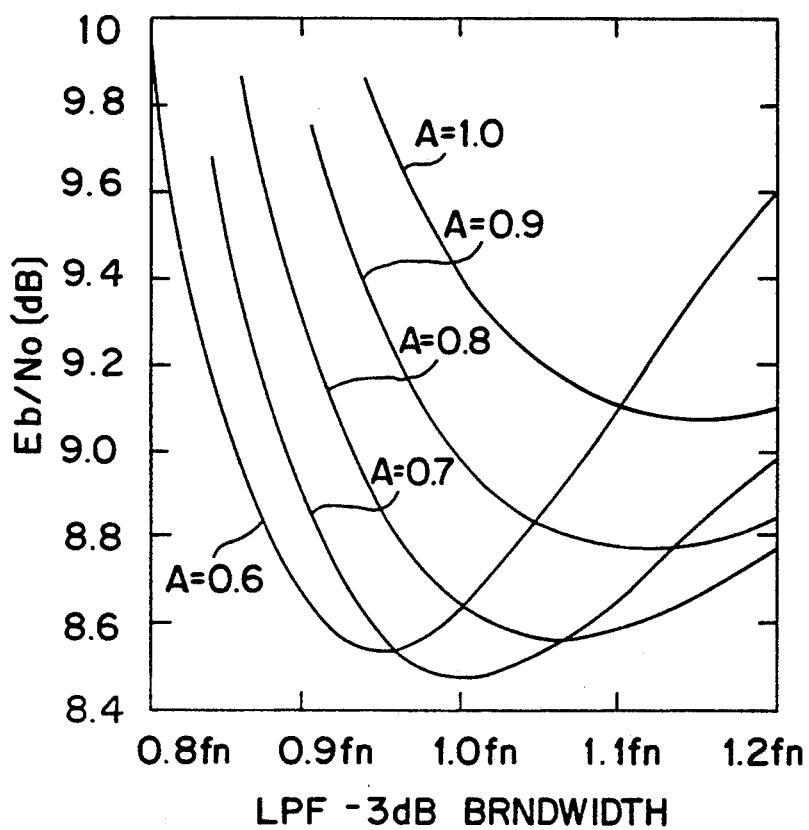
FIG. 9 illustrates characteristics of the probability of error in a modulator/demodulator using the present invention.

FIG. 9 shows a graph illustrating degradation of the output of the present invention and comparing it with a theoretical value for maintaining a probability of error Pe of 1 in 10,000, when the modulated output of the modulator of the present invention shown in FIG. 8 is transmitted via a linear channel, a six-pole Butterworth filter with a 3dB cutoff frequency of 1.3fn is employed as the third filter 6, and value A is adjusted for transmission to a classical offset-QAM demodulator which has four-pole Butterworth filter, the theoretical value of Eb/No is 8.4dB, where Eb is the bit energy and No is noise density.

Here, when A=0.7 and the 3dB cutoff frequency of a filter on the receiver side is 1.0 fn, degradation of Eb/No is equal to or below 0.1 dB, which shows a better probability of error (lower degradation) than does the prior art.

Figure 10:
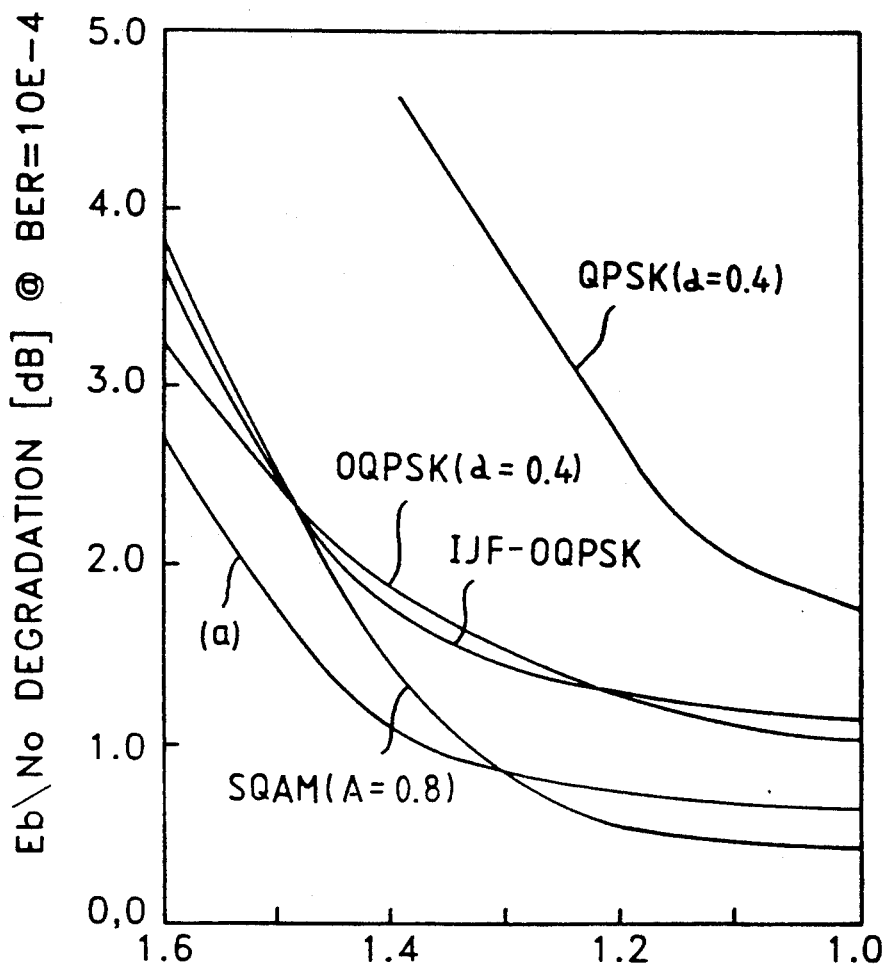
FIG. 10 is a graph illustrating a comparison of degradation of the bit energy/noise density ratio (Eb/No) of various modulation systems, which is caused by adjacent channel interference when a compact superposed signal of the present invention is transmitted in a non-linear channel.

FIG. 10 compares Eb/No degradation caused by adjacent channel interference with that of the prior art, when the output of the modulator using the present invention is transmitted via an HPA operating in the saturation region (0 dB input back-off), that is, via a non-linear channel. The vertical axis represents Eb/No degradation where Eb/No is 8.4 dB, which is compared with the theoretical value for maintaining an error probability of $Pe = 1 \times 10^{-4}$. The lower the degradation, the better the performance. The horizontal axis represents the channel interval between two adjacent channel signals or a spectral efficiency that is the reciprocal of the channel interval. As the interval becomes narrower, that is, as the spectral efficiency increases, it can be seen that Eb/No degradation of the present invention becomes less than those of other modulation methods (it means the performance is improved). In other words, more signals can be transmitted within the same limited bandwidth than do other modulation methods.

As described above, the compact superposed modulated generator of the present invention can be used as a bandwidth limiting filter which is required in transmitting and NRZ input data signal, and can also control the bandwidth of the main lobe and regrowth of side lobes according to a user's transmission requirements. Since the signal produced by the present invention has a narrow occupied bandwidth of the main lobe and little regrowth of its side lobes, a bandwidth and power efficient modulated signal is provided for a transmission system.

The modulator using a compact superposed modulated signal generator of the present invention as a bandwidth limiting filter is constructed in a simple hardware, has the better error probability performance, and provides a digital transmission system in which adjacent channel interference environment in the non-linear channel is less than that of the prior art.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A compact superposed modulated signal generator for use in a digital signal transmission system for transmitting digital information, said generator comprising:
   a first filter for converting an input non-return-to-zero (NRZ) digital data signal to a double interval raised cosine pulse signal;
   a second filter for converting said input NRZ digital data signal to a single interval raised cosine pulse signal;
   an attenuator for attenuating a signal output from said second filter;
   an adder/substractor for superposing a signal generated by said first filter on a signal attenuated by said attenuator; and
   a third filter for controlling the occupied bandwidth of a signal superposed by said adder/substractor wherein said third filter has a predetermined low ripple and a constant group delay within the pass-band for minimizing inter-symbol interference and decreasing errors.

2. A compact superposed modulated signal generator as claimed in claim 1 wherein an impulse response of said second filter is $0.5(1-\cos 2\pi t/T)$ where T represents a duration of the input data symbol.

3. A compact superposed modulated signal generator for use in a digital signal transmission system for transmitting digital information, said generator comprising:
   a first filter for converting an input non-return-to-zero (NRZ) digital data signal to a double interval raised cosine pulse signal;
   a second filter for converting said input NRZ digital data signal to a single interval raised cosine pulse signal;
   an attenuator for attenuating a signal output from said second filter;
   an adder/subtracter for superposing a signal generated by said first filter on a signal attenuated by said attenuator;
   a memory for storing a digitized waveform comprising previously sampled and quantized signals generated by said first filter, said second filter, said attenuator, said adder/subtracter, and said input NRZ digital data signal, and for outputting the digitized waveform responsive to an input data pattern and a clock signal;
   a D/A converter for converting the digitized waveform output from the memory into an analog signal; and
   a third filter for controlling the bandwidth of a signal superposed by said adder/subtracter and for eliminating unnecessary frequency components generated by the D/A converter.

4. A compact superposed modulated signal generator as claimed in claim 1 wherein said second filter comprises:
   a divide-by-two counter for dividing-by-two a clock synchronized to a period of the input NRZ digital data signal and for outputting a frequency divided signal;
   a band-pass filter for inputting the frequency divided signal and for extracting a single interval cosine function and for outputting a band-pass filtered signal;
   an absolute value generator for taking the absolute value of the band-pass-filtered signal;
   an inverter for inputting the input NRZ digital data signal and for outputting an inverted polarity signal;
   a multiplyer for multiplying the absolute value of the band-pass-filtered signal with the inverted polarity signal and outputting a multiplied signal;
   an attenuator for inputting the multiplied signal and outputting an attenuated signal;
   a delay circuit for inputting the input NRZ digital data signal;
   an XOR gate coupled to the delay circuit for outputting a control signal; and
   a switch responsive to the control signal for outputting the attenuated signal to said adder/subtracter if two serial input NRZ digital data bit signals have the same polarity and outputting zero volts to the adder/subtracter if the polarities do not match.

5. A compact superposed modulated signal generator as claimed in claim 2 wherein said second filter comprises:
   a divide-by-two counter for dividing-by-two a clock synchronized to a period of the input NRZ digital data signal and for outputting a frequency divided signal;
   a band-pass filter for inputting the frequency divided signal and for extracting a single interval cosine function and for outputting a band-pass filtered signal;
   an absolute value generator for taking the absolute value of the band-pass-filtered signal;
   an inverter for inputting the input NRZ digital data signal and outputting an inverted polarity signal;
   a multiplier for multiplying the absolute value of the band-pass-filtered signal with the inverted polarity signal and outputting a multiplied signal;
   an attenuator inputting the multiplied signal and outputting an attenuated signal;
   a delay circuit;
   an XOR gate, coupled to the delay circuit for outputting a control signal;
   a switch responsive to the control signal, for outputting the attenuated signal to said adder/subtracter if two serial input NRZ digital data bit signals have the same polarity, and outputting zero volts to the adder/subtracter if the polarities do not match.

6. A compact superposed modulated signal generated as claimed in claim 1 wherein said adder/subtracter is operated in subtract mode and wherein the second filter comprises:
- a divide-by-two count for dividing-by-two a clock synchronized to a period of the input NRZ digital data signal and for outputting a frequency divided signal;
- a band-pass filter for inputting the frequency divided signal and for extracting a single interval cosine function and for outputting a band-pass filtered signal;
- an absolute value generator for taking the absolute value of the band-pass-filtered signal;
- a multiplier for multiplying the absolute value of the band-pass-filtered signal with the inverted polarity signal and outputting a multiplied signal;
- an attenuator for inputting the multiplied signal and outputting an attenuated signal;
- a delay circuit for inputting the input NRZ digital data signal;
- an XOR gate coupled to the delay circuit for outputting a control signal; and
- a switch responsive to the control signal for outputting the attenuated signal to said adder/subtracter if two serial input NRZ digital data bit signals have the same polarity and outputting zero volts to the adder/subtracter if the polarities do not match.

7. A compact superposed modulated signal generator for use in a digital signal transmission system for transmission for transmit digital information, said generator comprising:
- a memory for storing a digitized waveform which corresponds to a digital signal formed by superposing a double interval raised cosine signal with an attenuated single interval raised cosine signal, and for outputting the digitized waveform responsive to an input data pattern;
- a D/A converter for converting the digitized waveform output from the memory into an analog signal; and
- a filter for controlling the bandwidth of the analog signal.

* * * * *